(12) United States Patent
Biris et al.

(10) Patent No.: US 8,365,568 B2
(45) Date of Patent: Feb. 5, 2013

(54) SEAMLESS MULTILAYER COMPOSITE PIPE

(75) Inventors: John Biris, Attica (GR); George Hinopoulos, Attica (GR); Apostolos Kaimenopoulos, Attica (GR)

(73) Assignee: Halcor Metal Works S.A., Athens (GR)

( * ) Notice: Subject to any disclaimer, the term of this patent is extended or adjusted under 35 U.S.C. 154(b) by 619 days.

(21) Appl. No.: 12/530,600

(22) PCT Filed: Apr. 20, 2007

(86) PCT No.: PCT/EP2007/053907
§ 371 (c)(1),
(2), (4) Date: Sep. 9, 2009

(87) PCT Pub. No.: WO2008/128571
PCT Pub. Date: Oct. 30, 2008

(65) Prior Publication Data
US 2010/0101292 A1    Apr. 29, 2010

(51) Int. Cl.
*B21C 23/22* (2006.01)
(52) U.S. Cl. ............................................. 72/258; 72/46
(58) Field of Classification Search ................. 72/46, 47, 72/258
See application file for complete search history.

(56) References Cited

U.S. PATENT DOCUMENTS

| | | |
|---|---|---|
| 3,720,557 A | 3/1973 | Longoni et al. |
| 2005/0178000 A1* | 8/2005 | McCullough et al. .......... 29/825 |

FOREIGN PATENT DOCUMENTS

| | | |
|---|---|---|
| EP | 1 815 918 A1 | 8/2007 |
| GB | 2 274 795 A | 8/1994 |
| WO | WO 2008/028866 A1 | 3/2008 |

OTHER PUBLICATIONS

Notification of Transmittal of the International Preliminary Report on Patentability for PCT/EP2007/053907, dated Jul. 10, 2009.
Written Opinion and International Search Report for PCT/EP2007/053907, mailed Jan. 13, 2009.

* cited by examiner

*Primary Examiner* — Edward Tolan
*Assistant Examiner* — Matthew G Katcoff
(74) *Attorney, Agent, or Firm* — Alston & Bird LLP (57) ABSTRACT

The present invention relates to a method of manufacturing a seamless multilayer composite pipe, an apparatus for manufacturing a seamless multilayer composite pipe, and a seamless multilayer composite pipe. The method of manufacturing a seamless multilayer composite pipe comprises the steps of a) providing a seamless metal pipe with at least one continuous layer covering its inner surface, and b) passing the seamless metal pipe through a unit in order to reduce the diameter of the seamless metal pipe by cold working. An apparatus for manufacturing a seamless multilayer composite pipe comprises a unit for providing a seamless metal pipe with at least one continuous layer covering its inner surface, and a unit for reducing the diameter of the seamless metal pipe by cold working. A seamless multilayer composite pipe comprises a seamless metal pipe with at least one continuous layer covering its inner surface, wherein the continuous layer covering the inner surface of the a seamless metal pipe is mechanically compressed.

6 Claims, 10 Drawing Sheets

SEAMLESS MULTILAYER COMPOSITE PIPE

FIELD OF THE INVENTION

The present invention relates to a method of manufacturing a seamless multilayer composite pipe, an apparatus for manufacturing a seamless multilayer composite pipe, and a seamless multilayer composite pipe.

RELATED PRIOR ART

Multilayer composite pipes built up from two concentric plastic layers with an intermediate layer of aluminium, mostly an aluminium foil, are conventionally made in subsequent steps by extruding a plastic pipe, covering it with a layer of adhesive and then wrapping around it a thin sheet or foil of aluminium. Finally an additional layer of adhesive and an external layer of plastic are applied, probably by extrusion to complete the compound structure.

To ensure strength and stability of the metal layer, the aluminium sheet or foil must be applied in transversely or obliquely overlapping fashion or be seam-welded using a TiG or a laser welding arrangement. These lead in turn to excessive use of metal, complicated machinery, the need for skilled operators and reduced output rates, resulting in higher production costs.

Welded multilayer pipes exhibit reduced strength to hydrostatic sustained pressure due to their lower strength resulting from the welded metal layer. In addition, the quality of the welded metal tube is controlled with difficulty as far as the resultant fusion strength is concerned, so these tubes exhibit an increased probability to develop welding failures (hidden defects), hence a decreased local strength.

SUMMARY OF THE INVENTION

The present invention was made to overcome the above-mentioned drawbacks.

It is therefore an object of the present invention to provide an improved method of manufacturing a seamless multilayer composite pipe, an advanced apparatus for manufacturing a seamless multilayer composite pipe, and an improved seamless multilayer composite pipe.

This object of the present invention is achieved by the respective subject-matter of the appended independent claims. Further advantageous developments are set forth in the dependent claims.

In detail, the above-mentioned object is attained by a first aspect concerning a method of manufacturing a seamless multilayer composite pipe, by a second aspect relating to an apparatus for manufacturing a seamless multilayer composite pipe, and a third aspect providing a seamless multilayer composite pipe.

The first aspect of the present invention concerns a method of manufacturing a seamless multilayer composite pipe comprising the steps of a) providing a seamless metal pipe with at least one continuous layer covering its inner surface, and b) passing the seamless metal pipe through a unit in order to reduce the diameter of the seamless metal pipe by cold working.

According to this first aspect, the method for manufacturing a multilayer composite pipe does not require complicated apparatus for manufacturing, involves simpler processing steps and is capable of increased output rates and reduced manufacturing costs.

In a preferred embodiment of the first aspect of the present invention, the method of manufacturing a seamless multilayer composite pipe comprises in step a), wherein the seamless metal pipe is provided with at least one continuous layer covering its inner surface, the further steps of a1) adjusting a distance d between a hot-extrusion die and a co-extrusion head in the direction of extrusion of the seamless metal pipe; a2) feeding metal material to the hot-extrusion die; a3) feeding adhesive material through a channel and feeding material for the continuous layer through a channel to the co-extrusion head; a4) extruding the metal material through the hot-extrusion die and cooling the hot seamless metal pipe through its external surface; and a5) co-extruding the adhesive material and the material for the continuous layer through the co-extrusion head onto the inner surface of the cooled seamless metal pipe, simultaneously to extruding the seamless metal pipe.

In another preferred embodiment of the first aspect of the present invention, the method of manufacturing a seamless multilayer composite pipe comprises in step a), wherein the seamless metal pipe is provided with at least one continuous layer covering its inner surface, the further steps of a6) adjusting a distance d between a hot-extrusion die and a co-extrusion head; a7) feeding metal material to the hot-extrusion die in the direction of extrusion of the seamless metal pipe; a8) feeding adhesive material through a channel and feeding a pre-extruded pipe-shaped layer to the co-extrusion head; a9) extruding the metal material through the hot-extrusion die and cooling the hot seamless metal pipe through its external surface; and a10) extruding the adhesive material through the co-extrusion head onto the inner surface of the cooled seamless metal pipe, simultaneously to extruding the seamless metal pipe.

Preferably, the at least one continuous layer is made of a plastic material in the method for manufacturing a multilayer composite pipe.

Further, in the method for manufacturing a multilayer composite pipe, subsequent to step b) a further step c) of co-extruding an adhesive material and a material for an outer layer through a respective extrusion head onto the outer surface of the seamless metal pipe may be carried out.

In the second aspect of the present invention, an apparatus for manufacturing a seamless multilayer composite pipe comprises a unit for providing a seamless metal pipe with at least one continuous layer covering its inner surface, and a unit for reducing the diameter of the seamless metal pipe by cold working.

According to this second aspect, the apparatus for manufacturing a seamless multilayer composite pipe is no complicated apparatus and can manufacture a seamless multilayer composite pipe at a reduced cost for all the required sizes compared with the pipes of this kind known so far.

In a preferred embodiment of the second aspect of the present invention, in the apparatus for manufacturing a seamless multilayer composite pipe the unit for providing the seamless metal pipe with the at least one continuous layer covering its inner surface is comprised of a hot-extrusion die for extruding a metal material into a pipe shape, a tube shaped supporting member comprising, in its interior, a channel for adhesive hot melt, a channel for the material for the continuous layer, and a channel for air supply, the channels being provided concentrically in this order from the outside to the inside, the tube shaped supporting member serving for guiding and supporting the as-extruded seamless metal pipe, a cooling tube provided around the tube shaped supporting member for guiding and supporting the hot seamless metal pipe, and a co-extrusion head, which is located in the direction of extrusion at the end of the tube shaped supporting member, the distance d between the hot-extrusion die and the co-extrusion head being adjustable depending on the technical requirements, and the length of the cooling tube being adaptable to the distance d.

In another preferred embodiment of the second aspect of the present invention, in the apparatus for manufacturing a seamless multilayer composite pipe the unit for providing the seamless metal pipe with the at least one continuous layer covering its inner surface is comprised of a hot-extrusion die for extruding a metal material into a pipe shape, a tube shaped supporting member comprising, in its interior, a channel for adhesive hot melt, and a channel for air supply, the channels being provided concentrically in this order from the outside to the inside, the tube shaped supporting member serving for guiding and supporting the as-extruded seamless metal pipe, a cooling tube provided around the tube shaped supporting member for guiding and supporting the hot seamless metal pipe, and a co-extrusion head, which is located in the direction of extrusion at the end of the tube shaped supporting member, the distance d between the hot-extrusion die and the co-extrusion head being adjustable depending on the technical requirements, and the length of the cooling tube being adaptable to the distance d.

Preferably, the unit for reducing the diameter of the seamless metal pipe by cold working is a sinking die provided at a predetermined distance from the co-extrusion head.

The third aspect of the present invention is a seamless multilayer composite pipe comprising a seamless metal pipe with at least one continuous layer covering its inner surface, wherein the continuous layer covering the inner surface of the a seamless metal pipe is mechanically compressed.

According to the above objects of the present invention, the multilayer composite pipe can be produced in all standard sizes for any fluid transporting application, such as hydraulic installations, under-floor and other heating systems, etc. However, non-standard sizes can also be made to meet specific requirements.

DETAILED DESCRIPTION OF THE PRESENT INVENTION

Method of Manufacturing a Seamless Multilayer Composite Pipe

The method of manufacturing a seamless multilayer composite pipe 1 comprises the steps of a) providing a seamless metal pipe 3 with at least one continuous layer 5 covering its inner surface, and b) passing the seamless metal pipe 3 through a unit 109, 209 in order to reduce the diameter of the seamless metal pipe 3 by cold working.

Figure 2:
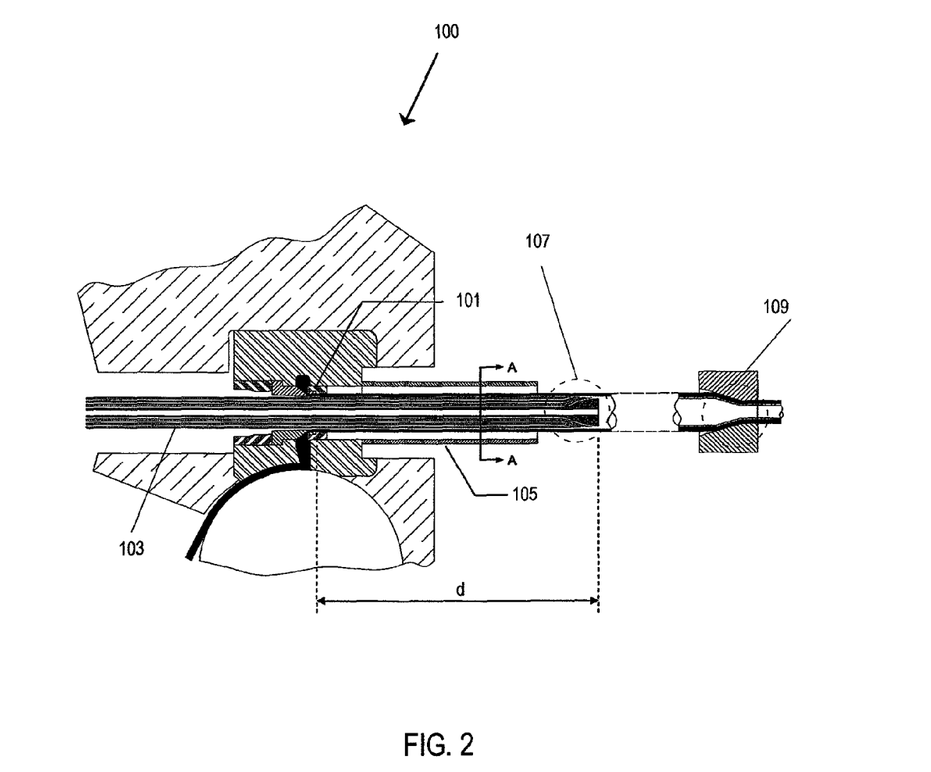
FIG. 2 is a schematic diagram illustrating one example of an apparatus 100 for manufacturing a seamless multilayer composite pipe 1 according to the present invention.
Figure 3:
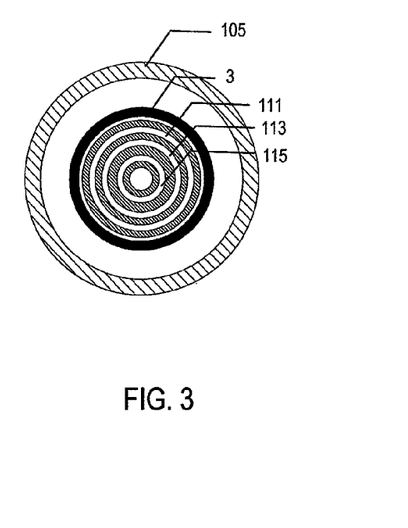
FIG. 3 shows the cross section at the line A-A of the apparatus 100 illustrated in FIG. 2.
Figure 4:
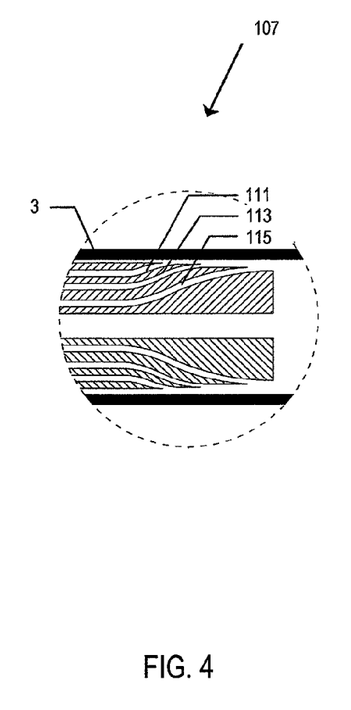
FIG. 4 is a detailed view showing the co-extrusion head 107 of the apparatus 100 illustrated in FIG. 2.
Figure 5:
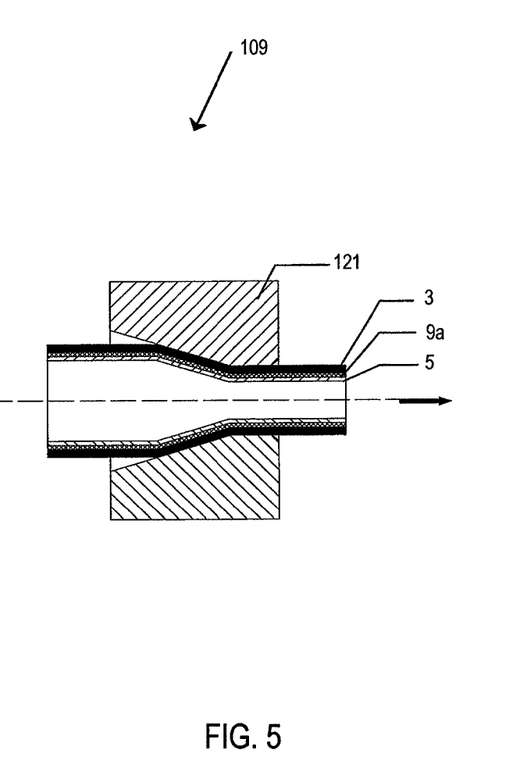
FIG. 5 is a detailed view showing the sinking die 109 of the apparatus 100 illustrated in FIG. 2.

In this method of manufacturing a seamless multilayer composite pipe 1, as a first alternative, in step a) the seamless metal pipe 3 is provided with at least one continuous layer 5 covering its inner surface by the further steps of a1) adjusting a distance d between a hot-extrusion die 101 and a co-extrusion head 107 in the direction of extrusion of the seamless metal pipe 3;

a2) feeding metal material to the hot-extrusion die 101;

a3) feeding adhesive material through a channel 111 and feeding material for the continuous layer 5 through a channel 113 to the co-extrusion head 107;

a4) extruding the metal material through the hot-extrusion die 101 and cooling the hot seamless metal pipe 3 through its external surface;

a5) co-extruding the adhesive material and the material for the continuous layer 5 through the co-extrusion head (107) onto the inner surface of the cooled seamless metal pipe 3, simultaneously to extruding the seamless metal pipe 3.

Figure 6:
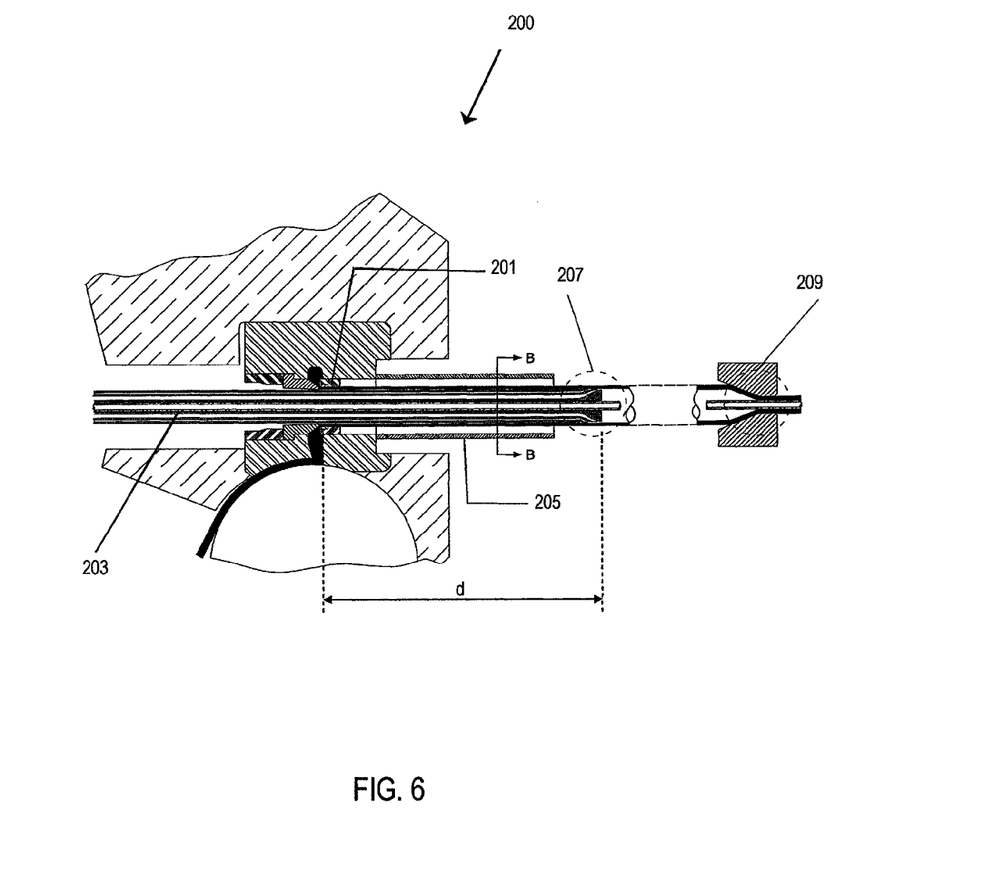
FIG. 6 is a schematic diagram illustrating another example of an apparatus 200 for manufacturing a seamless multilayer composite pipe 1 according to the present invention.
Figure 7:
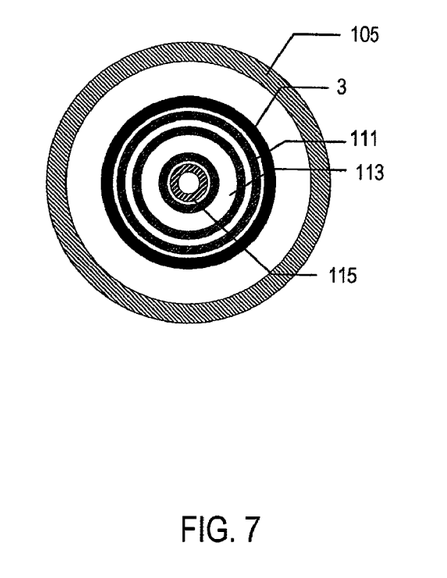
FIG. 7 shows the cross section at the line B-B of the apparatus 200 illustrated in FIG. 6.
Figure 8:
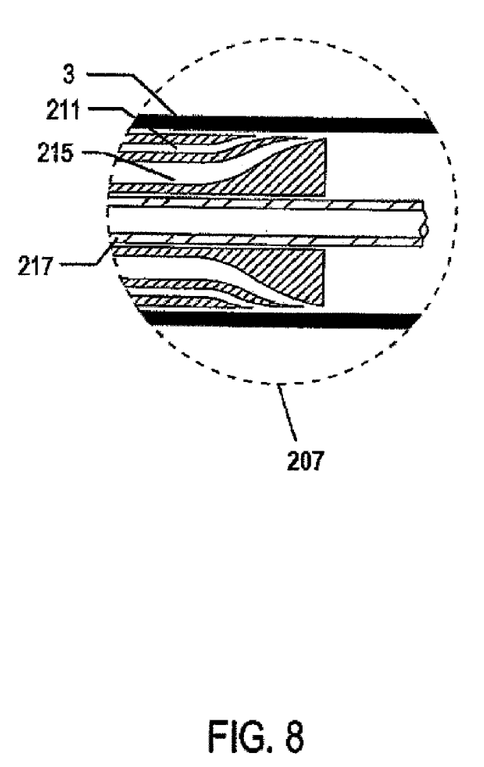
FIG. 8 is a detailed view showing the co-extrusion head 207 of the apparatus 200 illustrated in FIG. 6.
Figure 9:
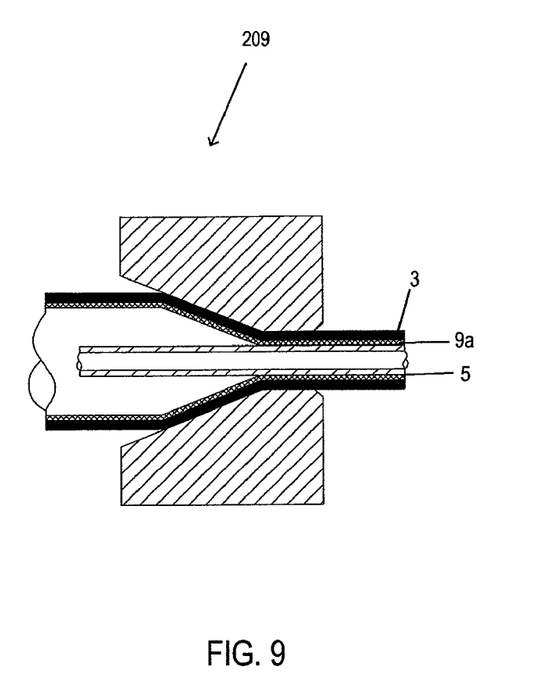
FIG. 9 is a detailed view showing the sinking die 209 of the apparatus 200 illustrated in FIG. 6.

As a second alternative, in the above method of manufacturing a seamless multilayer composite pipe 1, in step a) the seamless metal pipe 3 is provided with at least one continuous layer 5 covering its inner surface by the further steps of a6) adjusting a distance d between a hot-extrusion die 201 and a co-extrusion head 207 in the direction of extrusion of the seamless metal pipe 3;

a7) feeding metal material to the hot-extrusion die 201;

a8) feeding adhesive material through a channel 211 and feeding a pre-extruded pipe-shaped layer 217 to the co-extrusion head 207;

a9) extruding the metal material through the hot-extrusion die 201 and cooling the hot seamless metal pipe 3 through its external surface;

a10) extruding the adhesive material through the co-extrusion head 20) onto the inner surface of the cooled seamless metal pipe 3, simultaneously to extruding the seamless metal pipe 3.

Further Developments of the Method of Manufacturing a Seamless Multilayer Composite Pipe 1 and Their Alternatives In the above method of manufacturing a seamless multilayer composite pipe 1, the at least one continuous layer (5) is preferably made of a plastic material.

Furthermore, subsequent to step b) a further step c) of co-extruding an adhesive material and a material for an outer layer 7 through a respective extrusion head onto the outer surface of the seamless metal pipe 3 may be carried out.

Preferably, the metal material is extruded in steps a4) and a9), respectively, at substantially melting temperature. Moreover, this metal material is preferably an aluminium-based material. More preferably, the aluminium-based material is extruded in steps a4) and a9), respectively, at a temperature of about 500° C.

The cooling of the hot seamless metal pipe 3 in steps a4) and a9), respectively, through its external surface by, for instance, forced convection is preferably carried out within a temperature range of 140° C. to 240° C. Moreover, this cooling is preferably achieved by a specially designed cooling tube comprising internal spray nozzles and/or spray passages.

It is preferred to co-extrude the adhesive material and plastic material in steps a5) and a10), respectively, at substantially melting temperature. The preferred temperature range for the co-extruding in steps a5) and a10) is from 150° C. to 250° C.

The plastic material may be selected from the group comprising polyethylene (PE), polyethylene of raised temperature resistance (PE-RT), cross-linked polyethylene (PE-X), polypropylene (PP), random polypropylene (PP-R).

Moreover, metal deactivator additives and/or flame retardant additives may be added to the polymer composition.

The adhesive material is a mix of linear low density polyethylene (LLDPE) and a metal deactivator additive. The adhesive component forming the intermediate adhesive layer has maleic anhydride functionality that imparts polar characteristics to the non-polar PE base resin. Maleic anhydride bonds to metal substrates by creating both covalent and hydrogen bonds. Metal substrates generate oxides on the surface. These oxides are further hydrolysed with water to form hydroxyl groups on the metal surface. Maleic anhydride creates an ester linkage (covalent bonding) to the OH groups on the surface. When maleic anhydride rings open, they generate carboxyl groups. These carboxyl groups bond to the oxides and the hydroxides on the metal surface with hydrogen bonds.

Figure 10:
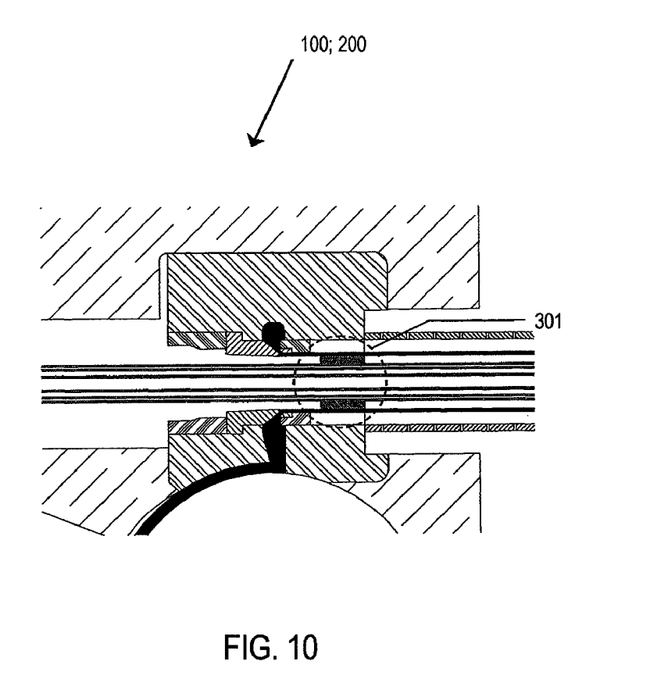
FIG. 10 shows a particular modification of the apparatus 100, 200 of FIG. 2 or FIG. 6.

In order to further enhance the adhesion of the plastic material to the seamless metal pipe 3, a mechanical etching of the inner surface of the seamless metal pipe 3 may be performed subsequent to steps a4) and a9), respectively, and in advance of steps a5) and a10), respectively. For this purpose, an etching tool (scraper) 301 etches (scrapes) the inner surface of the as extruded seamless metal pipe 3 so as to increase the surface roughness.

A similar mechanical etching step may be conducted subsequent to step b) and in advance of step c).

As a final step of the above first and second methods, collecting the seamless multilayer composite pipe 1, for instance by coiling, may be provided.

Apparatus for Manufacturing a Seamless Multilayer Composite Pipe

The structure of the apparatus 100, 200 for manufacturing a seamless multilayer composite pipe 1 will be described in the following with reference to the illustrations of FIG. 2 to FIG. 5, and FIG. 6 to FIG. 9, respectively.

The apparatus 100, 200 for manufacturing a seamless multilayer composite pipe 1 comprises a unit for providing a seamless metal pipe 3 with at least one continuous layer 5 covering its inner surface, and a unit 109, 209 for reducing the diameter of the seamless metal pipe 3 by cold working.

In the apparatus 100 for manufacturing a seamless multilayer composite pipe 1 the unit for providing the seamless metal pipe 3 with the at least one continuous layer 5 covering its inner surface is comprised of a hot-extrusion die 101 for extruding a metal material into a pipe shape, a tube shaped supporting member 103 comprising, in its interior, a channel 111 for adhesive hot melt, a channel 113 for the material for the continuous layer 5, and a channel 115 for air supply, the channels 111, 113, 115 being provided concentrically in this order from the outside to the inside, the tube shaped supporting member 103 serving for guiding and supporting the as-extruded seamless metal pipe 3, a cooling tube 105 provided around the tube shaped supporting member 103 for guiding and supporting the hot seamless metal pipe 3, and a co-extrusion head 107, which is located in the direction of extrusion at the end of the tube shaped supporting member 103, the distance d between the hot-extrusion die 101 and the co-extrusion head 107 being adjustable depending on the technical requirements, and the length of the cooling tube 105 being adaptable to the distance d.

By the co-extrusion head 107 the adhesive hot melt and the material for the continuous layer 5 are applied onto the inner surface of the seamless metal pipe 3 through the channels 111 and 113, respectively. A detailed view of the co-extrusion head 107 is given in FIG. 4.

In the apparatus 200 for manufacturing a seamless multilayer composite pipe 1, the unit for providing the seamless metal pipe 3 with the at least one continuous layer 5 covering its inner surface is comprised of a hot-extrusion die 201 for extruding a metal material into a pipe shape, a tube shaped supporting member 203 comprising, in its interior, a channel 211 for adhesive hot melt and a channel 215 for air supply, the channels 211, 215 being provided concentrically in this order from the outside to the inside, the tube shaped supporting member 203 serving for guiding and supporting the as-extruded seamless metal pipe 3, as illustrated in FIG. 7, a cooling tube 205 provided around the tube shaped supporting member 203 for guiding and supporting the hot seamless metal pipe 3, and a co-extrusion head 207, which is located in the direction of extrusion at the end of the tube shaped supporting member 203, the distance d between the hot-extrusion die 201 and the co-extrusion head 207 being adjustable depending on the technical requirements, and the length of the cooling tube 205 being adaptable to the distance d.

Through the channels 211 and 215 the adhesive hot melt and air are conveyed to the extrusion head 207. Moreover, a pre-extruded layer (preferably a plastic pipe) is supplied to the extrusion head 207 in the centre of the tube shaped supporting member 203.

By the extrusion head 207, the adhesive hot melt is applied onto the inner surface of the seamless metal pipe 3 through the channel 211. A detailed view of the extrusion head 207 is given in FIG. 8.

The adjustment of the distance d of the co-extrusion head 107, 207 with respect to the hot-extrusion die 101, 201 depends on the degree of the external cooling. For instance, if the temperature of the seamless metal pipe is above a desired range, either the co-extrusion head 107, 207 may be moved further down in the direction of the extrusion, or the cooling rate of the cooling tube 105, 205 may be increased, or both measures may be performed.

The tube shaped supporting member 103, 203 is preferably made of metal.

The tube shaped supporting member 103, 203 and the co-extrusion head 107, 207 may also act as calibration means for the inner diameter of the extruded seamless metal pipe 3 if they are sized so that they are in contact with the inner surface of the seamless metal pipe 3.

At a predetermined distance from the co-extrusion head 107, 207, a unit 109, 209 for reducing the diameter of the seamless metal pipe 3 by cold working is provided. This unit is preferably a sinking die. A detailed view showing the sinking die 109 is given in FIG. 5, a detailed view showing the sinking die 209 is given in FIG. 9.

Remote from the unit 109, 209, another extrusion device (not shown) may be provided for applying the continuous layer 7 onto the outer surface of the seamless metal pipe 3.

In addition, an etching tool (scraper) 301 may be provided subsequent to the hot-extrusion die 101, 201, as shown in FIG. 10, in order to mechanically etch the inner surface of the seamless metal pipe 3 so as to increase its roughness. A similar etching tool (not shown) may be provided subsequent to the unit 109, 209 for mechanically etching the outer surface of the seamless metal pipe 3.

Multilayer Composite Pipe 1

Figure 1:
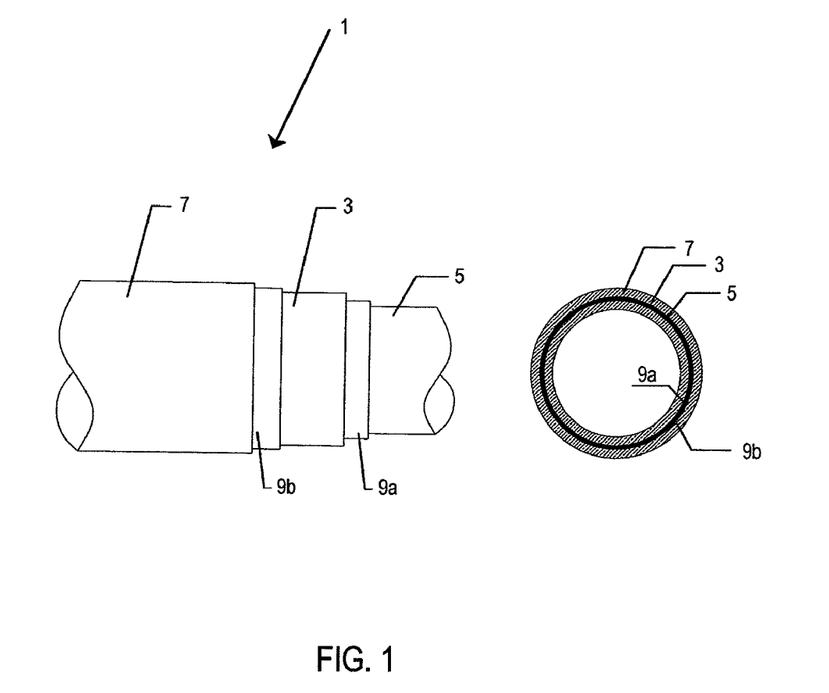
FIG. 1 is a scheme showing a seamless multilayer composite pipe 1 according to a preferred embodiment of the present invention.

The multilayer composite pipe 1 according to the present invention comprises a seamless metal pipe 3 with at least one continuous layer 5 covering its inner surface, wherein the continuous layer 5 covering the inner surface of the a seamless metal pipe 3 is mechanically compressed. Namely, the seamless multilayer composite pipe 1 is subjected after its manufacture to cold working in order to reduce the diameter of the seamless metal pipe 3 so as to obtain a desired dimension.

While subjecting the seamless metal pipe 3 to cold working, a compressive stress is applied to the continuous layer 5 covering the inner surface, thereby enhancing the tight adhesion of the continuous layer 5 to the seamless metal pipe 3 even in case the final multilayer composite pipe 1 is bent during its application. The continuous layer 5 is preferably made of plastic.

In order to further improve the adhesion of the inner continuous layer 5 to the seamless metal pipe 3, an adhesive layer 9a may be provided therebetween.

Aluminium or an aluminium alloy (referred to in the following as "Al-based material") is preferably used for the seamless metal pipe 3. In particular, the aluminium or aluminium alloy is suitably selected from the 1000 series (e.g., 1050, 1070, etc.), 3000 series (e.g., 3003, 3103, etc.) 6000 series (e.g., 6060, 6061, etc.) and 8000 series (e.g. 8011, etc.).

After having finished the cold working of the seamless metal pipe 3, a continuous layer 7, preferably of plastic, covering the outer surface may be provided on the seamless metal pipe 3. Preferably, this continuous layer 7 is adhered to the outer surface of the seamless metal pipe 3 via an adhesive layer 9b. A preferred embodiment of the seamless multilayer composite pipe 1 is shown in FIG. 1.

EFFECTS AND ADVANTAGES OF THE PRESENT INVENTION

The method of manufacturing a seamless multilayer composite pipe 1 according to the present invention is simple, involves fewer steps and avoids complicated precision operations such as wrapping and welding, resulting in a significant reduction of production costs.

The seamless multilayer composite pipe 1 can be produced in indefinite lengths to suit any requirements.

The elimination of the weld line in comparison to prior art products results in higher pressure resistance, since the metal material close to the weld line (heat-affected zone) is weaker that the base metal material.

The thickness of each of the layers, especially that of the seamless meta pipe 3, can be produced within a wider range of values than by the known methods.

The co-extrusion head 107, 207 applying the inner layer of plastic may be mounted adjustably in the direction of extrusion so as to allow application of the plastic material at the point where the temperature of the seamless metal pipe 3 has dropped to an acceptable level.

The seamless multilayer composite pipe 1 can be made flexible or rigid, depending on specific requirements by choosing the thickness for each of the coaxial layers, as well as choosing the amount of cold working during the sinking pass.

The robustness of the seamless multilayer composite pipe 1 dictated by the adhesion of the individual layers, is improved during the sinking pass due to the prevailingly resultant compression forces.

The invention claimed is:

1. A method of manufacturing a seamless multilayer composite pipe comprising:
   a) providing a seamless metal pipe formed by extrusion with at least one continuous layer covering its inner surface by co-extruding adhesive material and material for the at least one continuous layer onto the inner surface of the seamless metal pipe; and
   b) passing the seamless metal pipe covered with the at least one continuous layer through a unit to reduce the diameter of the seamless metal pipe by cold working,
   wherein in step a) the seamless metal pipe is provided with at least one continuous layer covering its inner surface by the further steps of:
   a1) adjusting a distance d between a hot-extrusion die and a co-extrusion head in the direction of extrusion of the seamless metal pipe;
   a2) feeding metal material to the hot-extrusion die;
   a3) feeding the adhesive material through a channel and feeding the material for the continuous layer through a channel to the co-extrusion head;
   a4) extruding the metal material through the hot-extrusion die and cooling the hot seamless metal pipe through its external surface; and
   a5) co-extruding the adhesive material and the material for the continuous layer through the co-extrusion head onto the inner surface of the cooled seamless metal pipe, simultaneously to extruding the seamless metal pipe.

2. A method of manufacturing a seamless multilayer composite pipe comprising:
   a) providing a seamless metal pipe formed by extrusion with at least one continuous layer covering its inner surface; and
   b) passing the seamless metal pipe through n unit to reduce the diameter of the seamless metal pipe by cold working;
   wherein in step a) the seamless metal pipe is provided with at least one continuous layer covering its inner surface by the further steps of:
   a6) adjusting a distance d between a hot-extrusion die and a co-extrusion head in the direction of extrusion of the seamless metal pipe;
   a7) feeding metal material to the hot-extrusion die;
   a8) feeding adhesive material through a channel and feeding a pre-extruded pipe-shaped layer to the co-extrusion head;
   a9) extruding the metal material through the hot-extrusion die and cooling the hot seamless metal pipe through its external surface; and
   a10) extruding the adhesive material through the co-extrusion head onto the inner surface of the cooled seamless metal pipe, simultaneously to extruding the seamless metal pipe.

3. The method of manufacturing a seamless multilayer composite pipe of claim 1, wherein the at least one continuous layer is made of a plastic material.

4. The method of manufacturing of claim 1, wherein, subsequent to step b), a further step c) of co-extruding an adhesive material and a material for an outer layer through a respective extrusion head onto the outer surface of the seamless metal pipe is carried out.

5. An apparatus for manufacturing a seamless multi layer composite pipe, comprising:
- a unit for providing a seamless metal pipe with at least one continuous layer covering an inner surface of the seamless metal pipe, the unit comprising:
  - a hot extrusion die for extruding a metal material into a pipe shape, thereby providing, the seamless metal pipe;
  - a co-extrusion head for co-extruding material for the at least one continuous layer onto the inner surface of the seamless metal pipe, thereby providing the seamless metal pipe with the at least one continuous layer covering its inner surface;
  - a tube shaped supporting member comprising, in its interior:
    - a channel for adhesive hot melt,
    - a channel for the material for the continuous layer, and
    - a channel for air supply;
    - wherein, the channels being provided concentrically in this order from the outside to the inside, the tube shaped supporting member serving for guiding and supporting the as-extruded seamless metal pipe;
  - a cooling tube provided around the tube shaped supporting member for guiding and supporting the hot seamless metal pipe;
  - wherein the co-extrusion head, which is located in the direction of extrusion at the end of the tube shaped supporting member, the distance d between the hot-extrusion die and the co-extrusion head being adjustable depending on the technical requirements, and the length of the cooling tube being adaptable to the distance d; and
- a unit for reducing the diameter of the seamless metal pipe with the at-least one continuous layer by cold working.

6. The apparatus for manufacturing a seamless multilayer composite pipe of claim 5, wherein the unit for reducing the diameter of the seamless metal pipe by cold working is a sinking die provided in a predetermined distance from the co-extrusion head.

* * * * *

UNITED STATES PATENT AND TRADEMARK OFFICE
CERTIFICATE OF CORRECTION

| | | |
|---|---|---|
| PATENT NO. | : 8,365,568 B2 | Page 1 of 1 |
| APPLICATION NO. | : 12/530600 | |
| DATED | : February 5, 2013 | |
| INVENTOR(S) | : Biris et al. | |

It is certified that error appears in the above-identified patent and that said Letters Patent is hereby corrected as shown below:

IN THE CLAIMS

Column 8, line 41, delete "n" and insert --a-- therefor.

Column 9, line 1, delete "multi layer" and insert --multilayer-- therefor.

Column 9, line 7, delete the "," following "providing".

Column 10, line 14, delete "at-least" and insert --at least-- therefor.

Signed and Sealed this
Thirtieth Day of July, 2013

Teresa Stanek Rea
*Acting Director of the United States Patent and Trademark Office*